United States Patent
Wolfsgruber et al.

(10) Patent No.: US 11,850,689 B2
(45) Date of Patent: Dec. 26, 2023

(54) WELDING DEVICE

(71) Applicant: Hilti Aktiengesellschaft, Schaan (LI)

(72) Inventors: Stefan Wolfsgruber, Pettenbach (AT); Philip Dörner, Pettenbach (AT); Andreas Starzengruber, Pettenbach (AT); Uwe Popp, Widnau (CH); Klaus Bertsch, Frastanz (AT)

(73) Assignee: HILTI AKTIENGESELLSCHAFT, Schaan (LI)

( * ) Notice: Subject to any disclaimer, the term of this patent is extended or adjusted under 35 U.S.C. 154(b) by 237 days.

(21) Appl. No.: 17/416,453

(22) PCT Filed: Nov. 29, 2019

(86) PCT No.: PCT/EP2019/083010
§ 371 (c)(1),
(2) Date: Jun. 18, 2021

(87) PCT Pub. No.: WO2020/126404
PCT Pub. Date: Jun. 25, 2020

(65) Prior Publication Data
US 2022/0072645 A1   Mar. 10, 2022

(30) Foreign Application Priority Data

Dec. 19, 2018 (EP) .................. 18213851

(51) Int. Cl.
*B23K 9/20* (2006.01)
*B23K 9/16* (2006.01)

(52) U.S. Cl.
CPC .............. *B23K 9/201* (2013.01); *B23K 9/16* (2013.01)

(58) Field of Classification Search
CPC ........ B23K 11/0053; B23K 9/16; B23K 9/20; B23K 9/201
See application file for complete search history.

(56) References Cited

U.S. PATENT DOCUMENTS 3,989,920 A * 11/1976 Masubuchi .......... B23K 9/0061
219/98
2008/0169277 A1* 7/2008 Achtner ................ B23K 9/167
219/136

FOREIGN PATENT DOCUMENTS

| CN | 102873441 B | 12/2015 |
|---|---|---|
| CN | 208132864 U | 11/2018 |
| DE | 20 2016 100 923 U1 | 4/2016 |
| FR | 2 765 508 A1 | 1/1999 |

OTHER PUBLICATIONS

International Search Report and Written Opinion in International Application No. PCT/EP2019/083010, dated May 26, 2020.

* cited by examiner

*Primary Examiner* — Dana Ross
*Assistant Examiner* — Joe E Mills, Jr.
(74) *Attorney, Agent, or Firm* — Leydig, Voit & Mayer, Ltd.

(57) ABSTRACT

An apparatus for welding a welding stud to a specified location of a base material, comprising a stud holder, comprising an inert gas cover, which surrounds the stud holder while forming a gap between the stud holder and the inert gas cover, and comprising a projection device, which is intended to project a visual pattern onto the base material through the gap.

20 Claims, 3 Drawing Sheets

WELDING DEVICE

CROSS-REFERENCE TO RELATED APPLICATIONS

Figure 1:
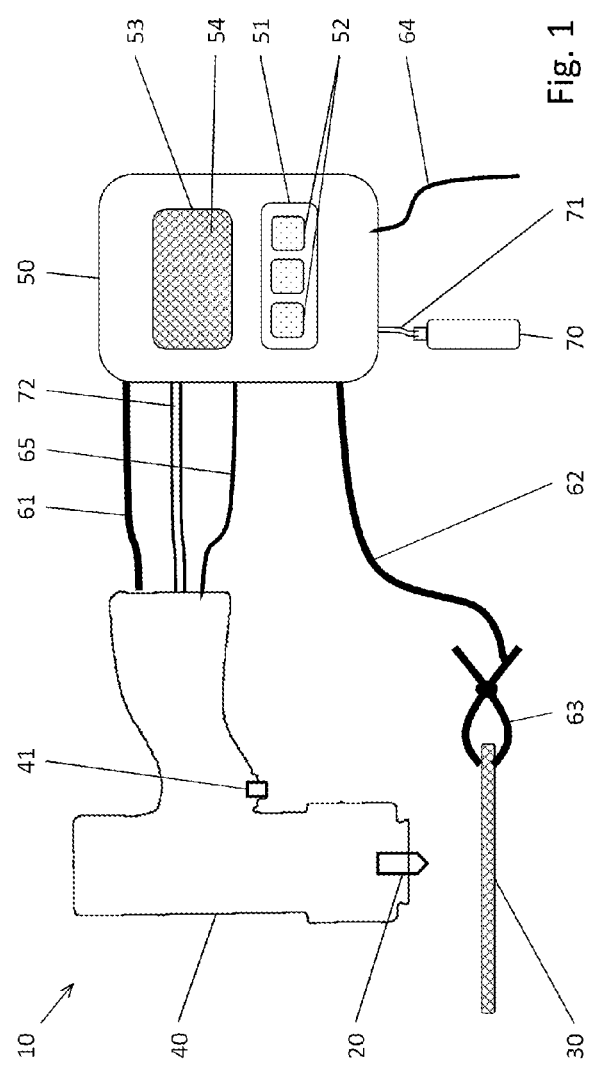

This patent application is the U.S. National Stage of International Patent Application No. PCT/EP2019/083010, filed Nov. 29, 2019, which claims the benefit of European Patent Application No. 18213851.1, filed Dec. 19, 2018, which are each incorporated by reference.

TECHNICAL FIELD

The invention relates generally to an apparatus for fastening a stud to a base material and also to such a stud.

PRIOR ART

There are numerous known apparatuses and methods by which various studs are fastened to a base material in different applications. For example, a stud is brought into contact with the base material and an electric current is applied to it. As soon as the electric current flows between the stud and the base material, the stud is lifted off the base material to form an arc. The energy that is released causes the material of the stud and the base material to be partially liquefied. The stud is then immersed in the liquefied material before this material cools down and becomes solid. The stud ends up being bonded to the base material.

In order to provide the necessary energy for liquefying the material of the stud and the base material in a sufficiently short time, there are known apparatuses that generate an electric current of a very high intensity and use a correspondingly rated electric cable to feed it to the stud. To avoid oxidizing of the liquefied material, it is known to surround the area of contact between the stud and the base material with an inert gas. Depending on how large an inert gas cover provided for this is, it is difficult to find the desired welding location.

In the case of applications in building construction or shipbuilding for example, threaded studs of various sizes to which an item is screwed are used in order to fasten the item to the base material. Some parameters of the fastening method, such as for example the duration and electrical power of the electric current, are to be set by the user on the apparatus and are to be adapted to the stud that is used. The user finally inspects the quality of the connection between the stud and the base material by means of a visual inspection. The quality of the connection consequently also depends on the experience and capabilities of the user.

SUMMARY OF THE INVENTION

The object of the invention is to provide an apparatus and/or a method with which fastening of a stud to a base material is made easier and/or improved.

The subject matter of this application is an apparatus for welding a welding stud to a specified location of a base material, comprising a stud holder, comprising an inert gas cover, which surrounds the stud holder while forming a gap between the stud holder and the inert gas cover, and comprising a projection device, which is intended to project a visual pattern onto the base material through the gap. This makes it easier to find the specified location even when there is an inert gas cover.

An advantageous embodiment is characterized in that the projection device comprises a light source. Preferably, the light source comprises a light-emitting diode. Similarly preferably, the projection device comprises a number of light sources, which are particularly preferably arranged uniformly around the stud holder.

An advantageous embodiment is characterized in that the projection device is attached to the inert gas cover. Preferably, the projection device is fastened to the inert gas cover. An alternative embodiment is characterized in that the projection device is attached to the stud holder. Preferably, the projection device is fastened to the stud holder. A further alternative embodiment is characterized in that the projection device is attached to a housing of the apparatus. Preferably, the projection device is fastened to the housing.

An advantageous embodiment is characterized in that the inert gas cover has a light aperture through which the visual pattern can be projected. An alternative embodiment is characterized in that the stud holder has a light aperture through which the visual pattern can be projected. A further alternative embodiment is characterized in that the apparatus has a housing that has a light aperture through which the visual pattern can be protected.

An advantageous embodiment is characterized in that the visual pattern comprises a point of light. A further advantageous embodiment is characterized in that the visual pattern comprises an auxiliary line. A further advantageous embodiment is characterized in that the visual pattern is arranged symmetrically around the specified location when a stud held by the stud holder is arranged at the specified location.

In the case of an advantageous embodiment, the apparatus comprises a welding-current contact element for applying a welding current to the welding stud in order to partially liquefy a material of the welding stud and/or the base material and/or comprises a stud lifting device for lifting the welding stud off the base material, while maintaining the flowing welding current between the welding stud and the base material, and/or comprises a stud immersing device for immersing the welding stud in the liquefied material of the welding stud and/or base material when the welding stud and/or the base material are partially liquefied due to the welding current.

EXEMPLARY EMBODIMENTS

Figure 2:
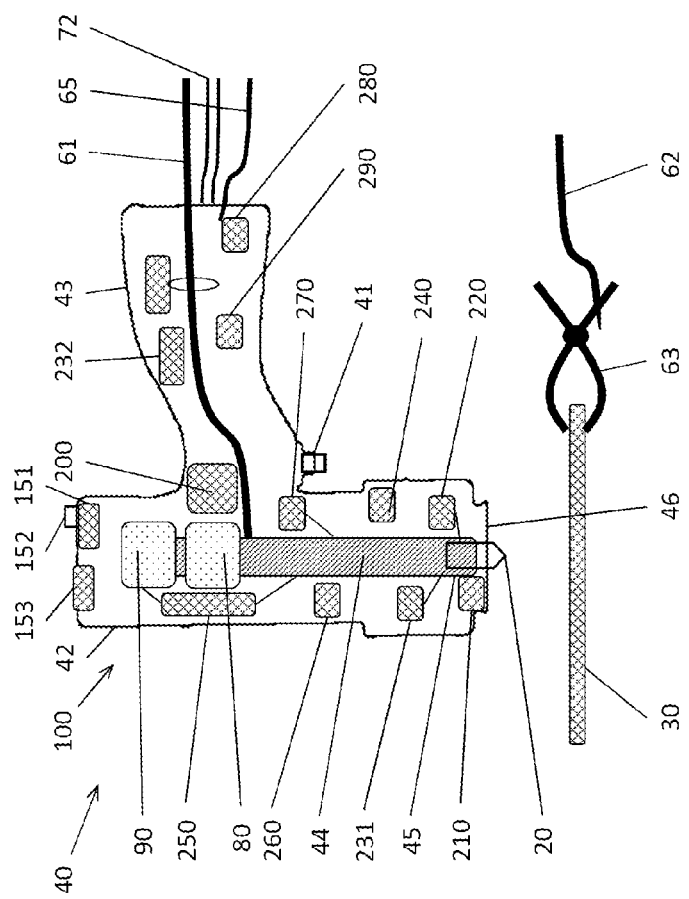

The invention is explained in more detail below on the basis of exemplary embodiments with reference to the drawings, in which:

FIG. 1 schematically shows a welding apparatus,

FIG. 2 schematically shows a welding gun and

Figure 3:
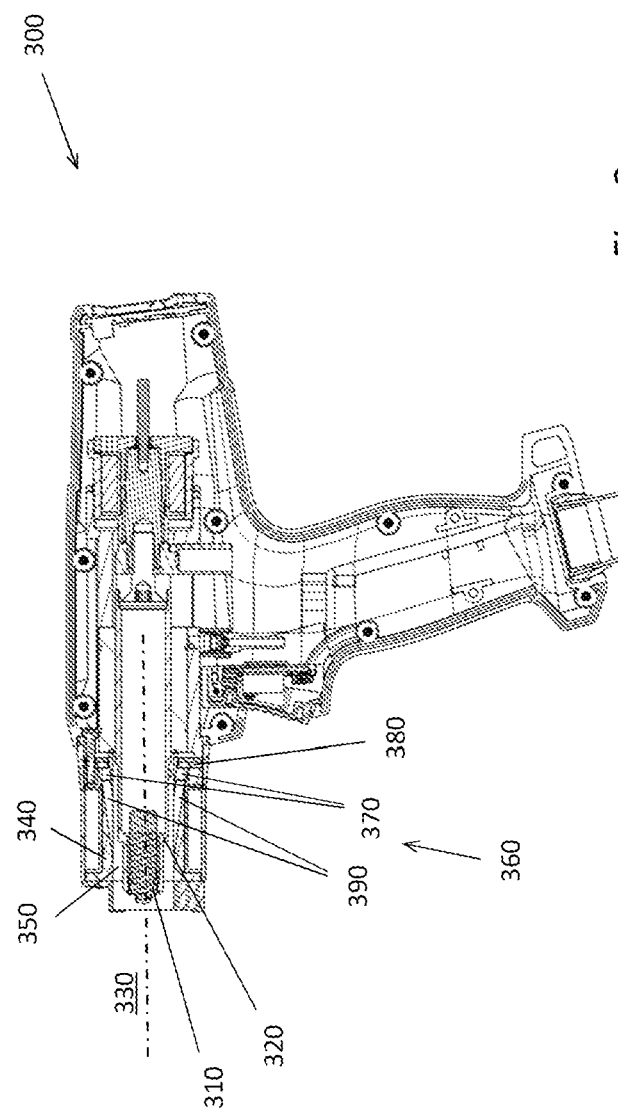

FIG. 3 shows a welding gun in a longitudinal section.

In FIG. 1, a welding apparatus 10 for welding a welding stud 20 to a base material 30 is schematically represented. A material of the welding stud 20 and a material of the base material 30 are electrically conductive, in particular metallic. The welding apparatus 10 comprises a welding gun 40 with a trigger switch 41, formed as a pushbutton switch, a welding unit 50, a first electric cable 61, a second electric cable 62 with a connection terminal 63, an electric supply cable 64, formed for example as a power cable, an electrical communication line 65, a gas reservoir 70, formed as a gas cylinder, a tubular gas supply line 71 and a gas hose 72.

The first cable 61 serves for supplying the welding stud 20 with electric current through the welding unit 50. The second cable 62 serves for electrically connecting the base material 30 to the welding unit 50 when the connection terminal 63 is clamped to the base material 30. When the welding stud 20 comes into contact with the base material 30, a circuit closes, so that welding current, for example in the form of direct current or alternating current, can be applied to the welding stud 20 by the welding unit 50. For this purpose, the welding gun 40 has a welding-current contact element that is not shown in FIG. 1. The welding unit 50 comprises a device that is not shown for converting electric current from the supply cable 64 into welding current, which comprises for example an electrical capacitor, a thyristor, a bipolar transistor with an isolated gate electrode or other components from power electronics and also an associated control unit with a microprocessor, in order to provide the welding current at the desired voltage and current intensity.

The gas supply line 71 and the gas hose 72 serve for supplying a contact region between the welding stud 20 and the base material 30 with an inert gas from the gas reservoir 70, in order to protect the contact region from oxidation due to oxygen from a surrounding area during a welding operation. For controlling a gas flow to the contact region, the gas reservoir 70, the gas supply line 71, the welding unit 50, the gas hose 72 or the welding gun 40 comprises a valve, in particular a controllable valve, that is not shown.

The welding unit 50 has an input device 51 with actuating elements 52 and also an output device 53 with a visual display element 54 and a wireless transmission unit. The input device 51 serves for inputting parameters of a welding process to be carried out with the welding apparatus 10, such as for example the electrical voltage, current intensity, power and duration of the welding current, position and speed of the stud and so on, by a user of the welding apparatus 10. The output device 53 serves for outputting information to the user, such as for example information on parameters of the welding process, information on detected emissions of the welding process or other variables, information on a quality of the welding operation, information on measures for improving the welding operation, information on detected characteristics of the welding stud or information derived from the aforementioned variables, and/or recommendations or instructions for cleaning and/or maintaining the welding apparatus 10, in particular the welding gun 40.

The communication line 65 serves for communication between the welding gun 40, in particular a control device of the welding gun 40 not shown in FIG. 1, and the welding unit 50, in particular the control unit and/or the input device 51 and/or the output device 53. By means of this communication, for example, an exchange of information about the parameters of a welding operation is accomplished, in order for example to achieve or facilitate a synchronization of the welding current with a movement of the welding stud 20. In the case of exemplary embodiments that are not shown, the communication between the welding gun and the welding unit takes place wirelessly, by radio or by means of the first electric cable, which carries the welding current.

In FIG. 2, the welding gun 40 is shown in more detail, with the welding stud 20 for fastening to the base material 30. The welding gun 40 has a housing 42 with an opening 46, from which a handle 43 with the trigger switch 41 protrudes. Also shown are the first electric cable 61, the second electric cable 62 with the connection terminal 63 clamped to the base material 30, the electrical communication line 65 and the gas hose 72.

The welding gun 40 also has a stud holder 44, on which the welding stud 20 is held during a welding operation. For this purpose, the stud holder comprises for example two, three, four or more resilient arms that are not shown in detail, between which the welding stud 20 is inserted and held by means of a clamping fit. The welding gun 40 also has for applying a welding current to the welding stud 20 a welding-current contact element 45, which is integrated in the stud holder 44, for example in the form of one or more of the resilient arms.

The welding gun 40 also has a control device 200 for controlling the various components and devices of the welding gun and the welding unit 50. The control device 200 is intended for controlling one or more parameters of the welding operation. For this purpose, the control device 200 comprises various electronic components, such as one or more microprocessors, one or more temporary or permanent data memories, and the like.

The welding gun 40 also has a stud lifting device 80, which is formed as a first lifting magnet, which acts on the stud holder 44 with a force away from the opening 46 to the rear (upwardly in FIG. 2) when the stud lifting device 80 is activated. Via a signal line that is not shown, the control device 200 communicates with the stud lifting device 80 in order to control the stud lifting device 80, in particular to activate and deactivate it.

The welding gun 40 also has a stud immersing device 90, formed as a second lifting magnet, which acts on the stud holder 44 forwardly with a force toward the opening 46 (downwardly in FIG. 2) when the stud immersing device 90 is activated. Via a signal line that is not shown, the control device 200 communicates with the stud immersing device 90 in order to control the stud immersing device 90, in particular to activate and deactivate it. In the case of an exemplary embodiment that is not shown, the stud immersing device is formed as a spring element which is tensioned when the stud holder is moved rearward by the stud lifting device and which moves the stud holder forward as soon as the stud lifting device is deactivated.

The welding gun 40 also has an influencing device 100 for influencing the speed of the welding stud caused by the stud immersing device 90. The influencing device 100 comprises the stud lifting device 80, formed as the first lifting magnet, as a first actuator and the stud immersing device 90, formed as the second lifting magnet, as a second actuator. In this case, the second actuator acts in the opposite direction to the first actuator. In the case of an exemplary embodiment that is not shown, the second actuator acts in the same direction as the first actuator. In both cases, the speed of the welding stud is influenced by the stud lifting device 80 and the stud immersing device 90 being alternately and/or simultaneously activated and deactivated by the control device 200. This makes it possible to repeatedly delay and/or reverse the movement of the welding stud 20 caused by the stud immersing device 90.

The welding gun 40 also has a detection device 210 for detecting emissions generated during the welding operation. The detection device 210 comprises, for example, a vibration sensor, a microphone, a temperature sensor, a radiation sensor, a camera or the like for the detection of acoustic, electrical, magnetic and/or optical emissions. Via a signal line that is not shown, the control device 200 communicates with the detection device 210 in order to receive signals representing the detected emissions and to carry out the control of the welding operation accordingly.

The welding gun 40 also has an identification device 220 for detecting one or more stud characteristics of the welding stud 20. The identification device 220 is suitable for detecting geometrical stud characteristics, such as for example a length and/or a width and/or a diameter of the welding stud 20. In the case of exemplary embodiments that are not shown, the identification device is suitable for detecting a material of the welding stud or an identification element of the welding stud attached to the welding stud at the factory. The welding gun 40 also has a stud-holder identification device 270, which is intended for detecting an identification element attached to the stud holder 44. If each stud type is assigned to a stud holder type, this allows an indirect detection of stud characteristics. For example, the stud holder 44 is only suitable for holding studs of a specific diameter, so that it is possible to conclude from detecting the stud holder 44 the diameter of the welding stud 20. Via a signal line that is not shown, the control device 200 communicates with the identification device in order to receive signals representing the detected stud characteristics and to carry out the control of the welding operation accordingly. In the case of an exemplary embodiment that is not shown, the identification element is attached to a packaging of the welding stud and is read, for example by way of a QR code or RFID, in particular by means of a cell phone or similar device.

The welding gun 40 also comprises a voltage detecting device 231 for detecting an electrical voltage applied between the welding stud 20 and the base material 30 during the welding operation and a current detecting device 232 for detecting the intensity of a current flowing between the welding stud 20 and the base material 30 during the welding operation. For this purpose, the voltage detecting device 231 preferably comprises a measuring contact, for example mounted at the opening 46, for tapping the electrical potential of the base material 30. Via a signal line that is not shown, the control device 200 communicates with the voltage detecting device 231 and the current-intensity detecting device 232 in order to receive signals representing the electrical voltage or current intensity, store them in one of their data memories and control one or more parameters of a subsequent welding operation in dependence on the parameters detected by the detecting devices 231, 232 during a previous welding operation.

The welding gun 40 also comprises a determination device 260 for determining a time duration of the immersing movement and a speed of the welding stud during the immersing movement of the welding stud 20. The position detecting device 250 is suitable for determining the position of the welding stud prior to the lifting-off movement and after the immersing movement, and the control device 200 is suitable for determining a difference between these two positions and assessing the quality of the welded connection between the welding stud 20 and the base material 30.

The welding gun 40 also has an input device 151 with an actuating element 152 and also an output device 153 with a visual display element and a wireless transmission unit. The input device 151 serves for inputting parameters of a welding process to be carried out with the welding gun 40, such as for example the electrical voltage, current intensity, power and duration of the welding current, position and speed of the stud and so on, by a user of the welding gun 40. The output device 153 serves for outputting information to the user, such as for example information on parameters of the welding process, information on detected emissions of the welding process or other variables, information on a quality of the welding operation, information on measures for improving the welding operation, information on detected characteristics of the welding stud or information derived from the aforementioned variables, and/or recommendations or instructions for cleaning and/or maintaining the welding gun 40. Via signal lines that are not shown, the control device 200 communicates with the input device 151 and the output device 153 to receive information input by means of the input device 151 or to send information to be output to the output device 153.

The welding gun 40 also has an orientation detection device 290 for detecting an orientation of the welding gun 40 with respect to the direction of gravity. The orientation detection device 290 detects for example whether the welding gun 40 is aligned downward, to the side or upward during the welding operation. The orientation detection device 290 determines the orientation of the welding gun 40, for example by evaluating the acceleration of the stud holder during a lifting movement or by evaluating a time profile of the electrical voltage of the welding current. The information about the orientation of the welding gun 40 serves for improved control of the parameters of the welding operation.

As part of a device for finding a welding location specified for the welding stud, the welding gun 40 also comprises a detection device 240 for detecting an electrical contact resistance between the welding gun 40, in particular the opening 46 or the stud holder 44, and the base material 30 and/or between the welding stud 20 and the base material 30. In addition, the device for finding a welding location specified for the welding stud comprises a position detecting device 250 for detecting the position of the welding stud 20 and the stud holder 44 with respect to the remainder of the welding gun 40 to detect a difference in height between the specified location and the remaining surface of the base material. Via a signal line that is not shown, the control device 200 communicates with the detection device 240 and the position detecting device 250 in order to receive and process signals which represent the contact resistance or the position of the welding stud 20 and the stud holder 44.

As a further part of the device for finding the welding location specified for the welding stud 20, the welding gun comprises a projection device 280 for projecting one or more auxiliary lines onto the base material 30. For this purpose, the projection device 280 has for example a laser, which projects the auxiliary lines onto the base material 30. The auxiliary lines indicate to a user of the welding gun 40 the location on the base material 30 to which the welding stud 20 is welded at the respective position of the welding gun 40.

FIG. 3 shows an apparatus 300, formed as a welding gun, for welding a welding stud 310 to a specified welding location of a base material that is not shown. The apparatus 300 comprises a stud holder 320, on which the welding stud 310 is held during a welding operation, so that the welding stud 310 moves with the stud holder 320 along a welding axis 330. Furthermore, the apparatus 300 comprises an inert gas cover 340, which surrounds the stud holder peripherally around the welding axis 330, while forming a gap 350 between the stud holder 320 and the inert gas cover 340. As a result, it is possible to surround the stud holder 320 and the welding stud 310 with an inert gas, the inert gas flowing through the gap 350.

The apparatus 300 comprises a projection device 360, which comprises a number of light sources 370, in the present exemplary embodiment six, formed as light-emitting diodes, which are arranged uniformly around the stud holder 320. The light sources 370 are fastened to the inert gas cover 340 by means of a circuit board 380, on which the light sources 370 are wired. The inert gas cover 340 has light apertures 390, a light source 370 being arranged in each case on or in a light aperture 390. In the case of exemplary embodiments that are not shown, the light sources and/or light apertures are attached to or provided on the stud holder or a housing of the apparatus.

The light sources 370 project a visual pattern through the light apertures 390 and the gap 350 onto the base material to facilitate finding the specified welding location. Under some circumstances, the light is reflected at an outer surface of the stud holder 320 and/or an inner surface of the inert gas cover 340 before it strikes the base material. The visual pattern comprises points of light, auxiliary lines or a pattern made up symmetrically around the welding axis 330, such as for example a circle or a rosette. In particular, the visual pattern comprises a shadow of the stud holder 320, likewise formed symmetrically about the welding axis 330. A user of the apparatus 300 can easily place the welding stud 310 at the specified welding location on the base material by aligning the pattern projected onto the base material symmetrically around the specified welding location.

The invention has been described on the basis of examples of an apparatus and a method for welding a welding stud to a base material. The features of the described embodiments can also be combined as desired with one another within a single welding apparatus or a single welding process. It is pointed out that the apparatus according to the invention and the method according to the invention are also suitable for other purposes.

The invention claimed is:

1. An apparatus for welding a welding stud to a specified location of a base material, comprising a stud holder, comprising an inert gas cover, which surrounds the stud holder while forming a gap between the stud holder and the inert gas cover, and comprising a projection device, which projects a visual pattern onto the base material through the gap.

2. The apparatus as claimed in claim 1, the projection device comprising a light source.

3. The apparatus as claimed in claim 2, the light source comprising a light-emitting diode.

4. The apparatus as claimed in claim 2, the projection device comprising a number of light sources.

5. The apparatus as claimed in claim 4, the light sources being arranged uniformly around the stud holder.

6. The apparatus as claimed in claim 1, the projection device being attached to the inert gas cover.

7. The apparatus as claimed in claim 1, the projection device being attached to the stud holder.

8. The apparatus as claimed in claim 1, the apparatus having a housing, and the projection device being attached to the housing.

9. The apparatus as claimed in claim 1, the inert gas cover having a light aperture through which the visual pattern can be projected.

10. The apparatus as claimed in claim 1, the stud holder having a light aperture through which the visual pattern can be projected.

11. The apparatus as claimed in claim 1, the apparatus having a housing that has a light aperture through which the visual pattern can be projected.

12. The apparatus as claimed in claim 1, the visual pattern comprising a point of light.

13. The apparatus as claimed in claim 1, the visual pattern comprising an auxiliary line.

14. The apparatus as claimed in claim 1, the visual pattern being arranged symmetrically around the specified location when a stud held by the stud holder is arranged at the specified location.

15. The apparatus as claimed in claim 1, further comprising a welding-current contact element for applying a welding current to the welding stud in order to partially liquefy a material of the welding stud and the base material and comprising a stud lifting device for lifting the welding stud off the base material, while maintaining the flowing welding current between the welding stud and the base material, and comprising a stud immersing device for immersing the welding stud in the liquefied material of the welding stud and base material when the welding stud and the base material are partially liquefied due to the welding current.

16. The apparatus as claimed in claim 6, the projection device being fastened to the inert gas cover.

17. The apparatus as claimed in claim 7, the projection device being fastened to the stud holder.

18. The apparatus as claimed in claim 8, the projection device being fastened to the housing.

19. The apparatus as claimed in claim 3, the projection device comprising a number of light sources.

20. The apparatus as claimed in claim 19, the light sources being arranged uniformly around the stud holder.

* * * * *